United States Patent
Lau et al.

(10) Patent No.: US 8,107,395 B2
(45) Date of Patent: Jan. 31, 2012

(54) SELF-CORRECTING ADAPTIVE TRACKING SYSTEM (SATS)

(75) Inventors: Richard Lau, Morganville, NJ (US);
HeeChang Kim, Marlboro, NJ (US);
Arnold L. Neidhardt, Middletown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 435 days.

(21) Appl. No.: 12/492,658

(22) Filed: Jun. 26, 2009

(65) Prior Publication Data
US 2010/0265836 A1    Oct. 21, 2010

Related U.S. Application Data

(60) Provisional application No. 61/075,986, filed on Jun. 26, 2008.

(51) Int. Cl.
*H04L 12/28* (2006.01)
(52) U.S. Cl. ............ 370/252; 370/310; 455/404.2; 455/407; 455/427; 455/456.1; 342/118; 342/147
(58) Field of Classification Search ............ 370/252, 370/310; 455/404.2, 407, 427, 456.1; 342/118, 342/147
See application file for complete search history.

(56) References Cited

U.S. PATENT DOCUMENTS

| | | | |
|---|---|---|---|
| 7,020,501 B1 * | 3/2006 | Elliott et al. | 455/574 |
| 7,031,725 B2 | 4/2006 | Rorabaugh | |
| 2004/0033808 A1 * | 2/2004 | Rorabaugh | 455/456.1 |
| 2005/0080924 A1 * | 4/2005 | Shang et al. | 709/239 |
| 2007/0060098 A1 | 3/2007 | McCoy | |

OTHER PUBLICATIONS

The International Search Report dated Aug. 12, 2009.

* cited by examiner

*Primary Examiner* — Luat Phung
(74) *Attorney, Agent, or Firm* — Philip J. Feig

(57) ABSTRACT

A system and method for self and group location and tracking based on ultra wide band ranging among members of the group is presented. The system comprises an anchored station, a plurality of nodes, each node having at least knowledge of where the node is facing and heading, knowledge of all pair wise distances among all of the plurality of nodes, and ability to exchange information among the nodes and with the anchored station via relays. The system and method find a new position estimate of the group in accordance with an adaptive search process based on constraints of the ultra wide band ranging, and the search process enables extracting directional information and adaptively stabilizing orientation of the group. In one embodiment, adaptively stabilizing the orientation of the group is performed using an orientation-correcting polygon matching process.

16 Claims, 11 Drawing Sheets a) FINDING THE BEST FIT FOR $U_{AB}$ b) PENALTY FUNCTION: e1+e2

FIG. 5

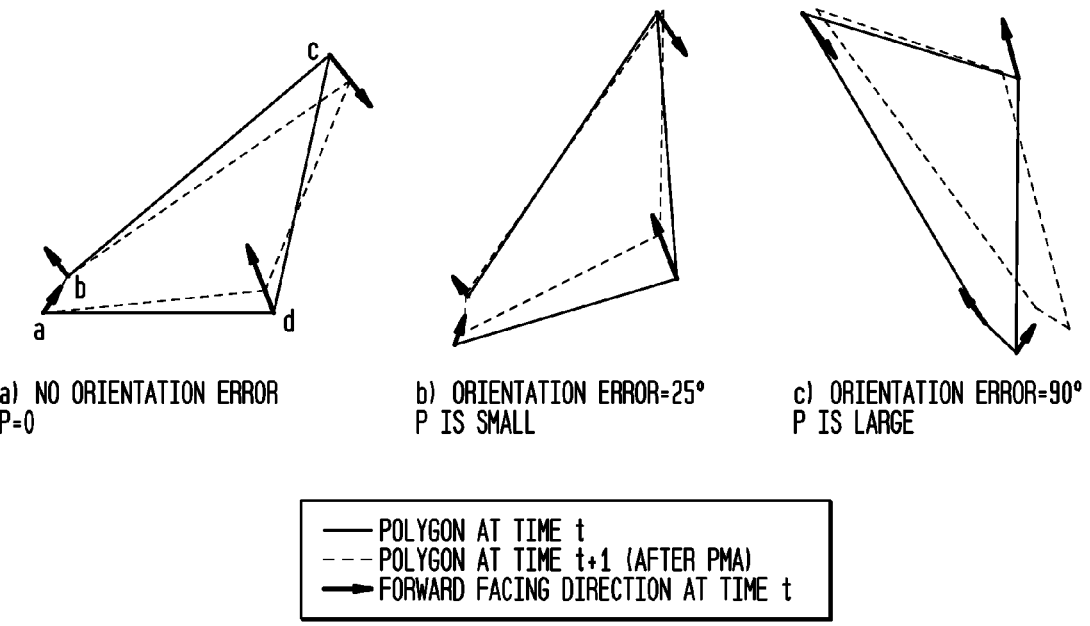

a) NO ORIENTATION ERROR
P=0 b) ORIENTATION ERROR=25°
P IS SMALL c) ORIENTATION ERROR=90°
P IS LARGE

——— POLYGON AT TIME t
--- POLYGON AT TIME t+1 (AFTER PMA)
➤ FORWARD FACING DIRECTION AT TIME t

FIG. 6

POLYGON SIDES:
$\underline{a}=[1\ 1]'$
$\underline{b}=[9\ 6]'$
$\underline{c}=[2\ 7]'$
$\underline{d}=[8\ 0]'$ FORWARD FACING VECTORS:
$\underline{w}_1=[0.1\ 0.1]'$
$\underline{w}_2=[0\ 0.15]'$
$\underline{w}_3=[0.2\ -0.1]'$
$\underline{w}_4=[-0.12\ 0.21]'$

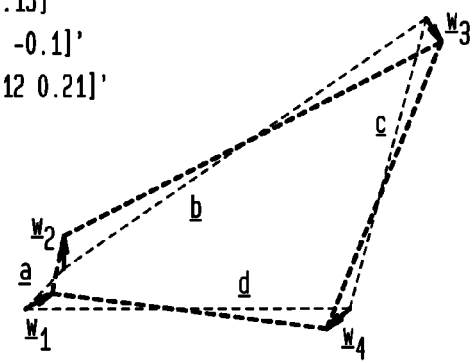

--- POLYGON AT TIME t
——— POLYGON AT TIME t+1

FIG. 9
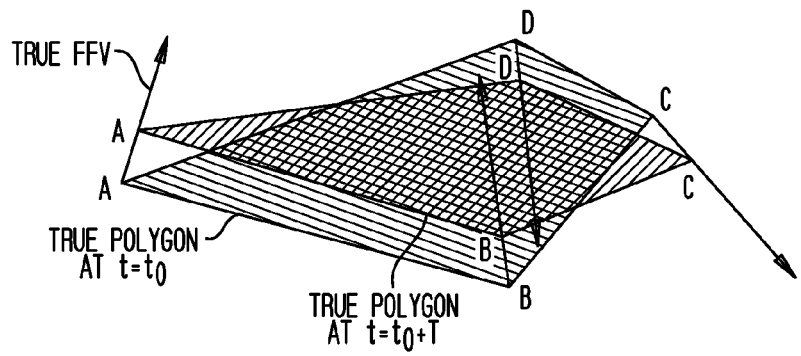
a) TRUE POLYGON
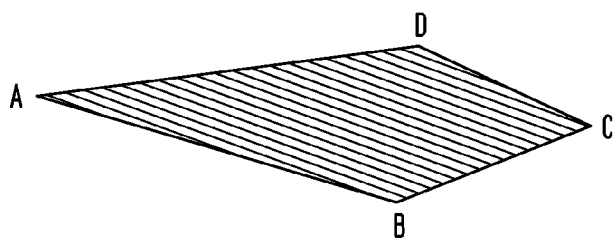
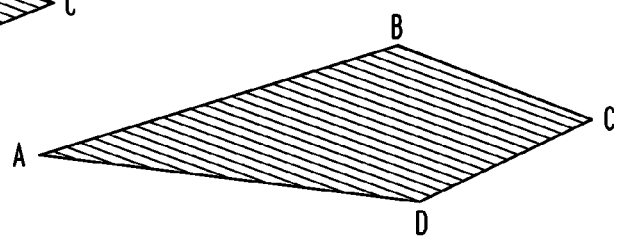
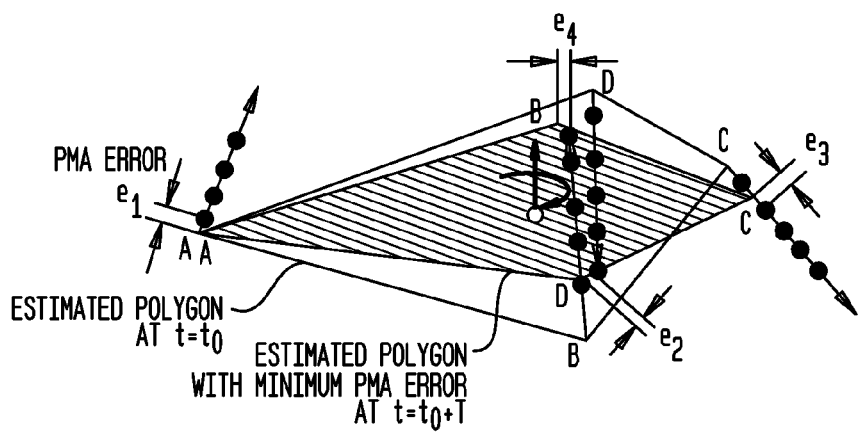
b) ESTIMATED POLYGON WHEN A POLYGON FLIP OCCURS

FIG. 10
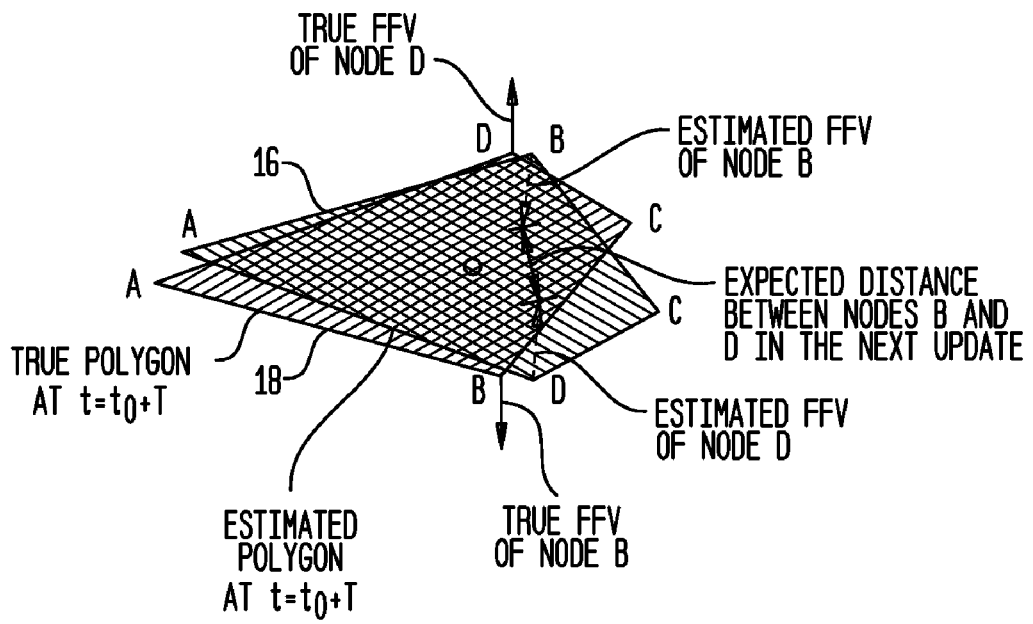
a) TRUE AND FLIPPED ESTIMATED POLYGONS AT $t=t_0$
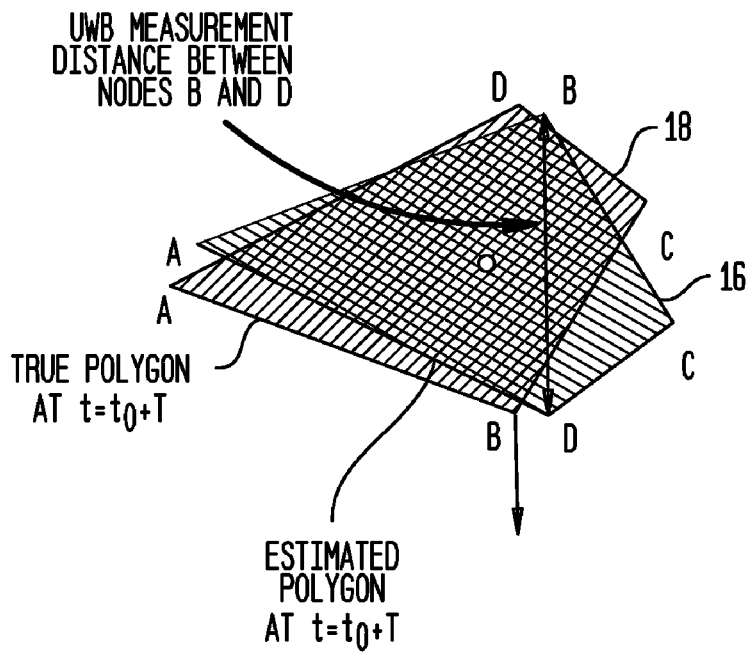
b) TRUE AND FLIPPED ESTIMATED POLYGONS AT $t=t_0+T$

TRUE POLYGON VS. ESTIMATED POLYGON

TRUE POLYGON VS. ESTIMATED POLYGON

TRUE POLYGON VS. ESTIMATED POLYGON

TRUE POLYGON VS. ESTIMATED POLYGON

SELF-CORRECTING ADAPTIVE TRACKING SYSTEM (SATS)

CROSS REFERENCE TO RELATED APPLICATIONS

The present invention claims the benefit of U.S. provisional patent application 61/075,986 filed Jun. 26, 2008, the entire contents and disclosure of which are incorporated herein by reference as if fully set forth herein.

GOVERNMENT LICENSE RIGHTS

This invention was made with Government support under N00014-06-C-0487 awarded by the Department of the Navy. The Government has certain rights in this invention.

FIELD OF THE INVENTION

The present invention relates generally to group location, and in particular to group location and remote tracking.

BACKGROUND OF THE INVENTION

Global Positioning System (GPS) is a valuable tool for self locating as well as tracking members of a group. The benefits of GPS are recognized in numerous military as well as civilian applications. In many situations, however, GPS signals are simply not available or, at best, intermittently observable. For example, in military or emergency rescue team applications, it is desirable for a team member to track the locations of his/her peers and to have a centralized location tracking the location of the team. Examples include a Marine fire team in a combat operation, or a rescue team entering a building or an underground cave. In these cases, extended absence of UPS is expected, which makes GPS-only tracking systems almost unusable.

A traditional approach to this problem relies on Inertia Measurement Units (IMU) and applies an appropriate reference frame transformation to estimate position. However, for low-cost commercial grade IMU, the bias in the accelerometer and gyroscope of the IMU produces substantial errors and renders this approach ineffective. Adding ranging sensors among group members using RF or ultrasonic devices has also been studied; these techniques may provide sufficient range accuracy, but are not able to provide accurate group navigation due to lack of directional information.

SUMMARY OF THE INVENTION

A novel method, called Self-correcting Adaptive Tracking System (SATS), which focuses on solving the group location problem when GPS is not available, is presented. The novel system makes group navigation and remote tracking possible when GPS is not available.

An inventive system and method for self and group location and tracking based on ultra wide band ranging among members of the group is presented. The system comprises an anchored station, a plurality of nodes, each node having at least knowledge of where the node is facing and heading, knowledge of all pair wise distances among all of the plurality of nodes, and ability to exchange information among the nodes and with the anchored station via one or more relays. A leader node among a plurality of nodes determines placement of the relays by detecting a weak signal from the anchored station and an adaptive search process finds a new position estimate of the group based on constraints of the pair wise distances, enabling extracting of directional information and adaptively stabilizing orientation of the group. In one embodiment, both GPS-enabled and GPS-denied partitions are in the system. In one embodiment, the ability to exchange information comprising inertial measurements and pair wise ranging measurements is performed using WLAN. In one embodiment, the remote command node initializes the plurality of nodes, assigns one of the nodes as a leader node, runs a graphical user interface in a north-facing mode, and maintains communication with the leader node via WLAN. In one embodiment, adaptively stabilizing the orientation of the group is performed using an orientation-correcting polygon matching process. In one embodiment, the orientation-correcting polygon matching process comprises initializing a first orientation and a second orientation for each node at a first time, incrementing the first time and obtaining polygon matching results, calculating an error function value for the first orientation and the second orientation at the first time, and if the error function of the first orientation is greater than the error function of the second orientation, setting a second-time-first orientation for a second time to the first orientation less a constant, setting a second-time-second orientation for the second time to the second orientation less the constant, otherwise setting the second-time-first orientation for the second time to the first orientation plus the constant, setting the second-time-second orientation for the second time to the second orientation plus the constant, and incrementing the second time. In another embodiment, the orientation-correcting polygon matching process comprises determining whether the pair wise distance between a first node and a second node of the plurality of nodes has changed, calculating an expected distance between expected positions of the first node and the second node, and detecting a flip based on the expected positions of the first and second nodes and the pair wise distance between the first and second nodes.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 5 shows a Clique Orientation Error Function;
FIG. 6 shows a numerical example of simulated polygons;
FIG. 9 illustrates polygon flip;
FIG. 10 illustrates polygon flip detection.

DETAILED DESCRIPTION

The inventive Self-correcting Adaptive Tracking System (SATS) is part of the Office of Naval Research (ONR) program entitled "Navigation in a GPS-denied Environment". SATS targets solving a self- and peer-group-location problem when GPS is not available. In the absence of GPS, SATS augments navigation capability by using intelligent processing of a combination of reference signals of Inertial Measurement System (IMS), Ultra-Wide Band (UWB) localization, and 802.11 (WLAN) radio for exchanging information. Each of these reference signals has a unique capability that can contribute to the final solution. Accordingly, SATS is a dynamic adaptive procedure that performs self-correction of location and orientation errors.

The inventive system can be viewed as a group of nodes called a clique moving with close proximity most of the time. Each node, e.g. SATS node, in the clique has the following capabilities: knowledge of where the node is facing and/or heading, knowledge of all the pair wise distances among all the nodes, the ability to exchange information among nodes, and the ability to exchange information with a remote command node using WLAN via relays.

Figure 1:
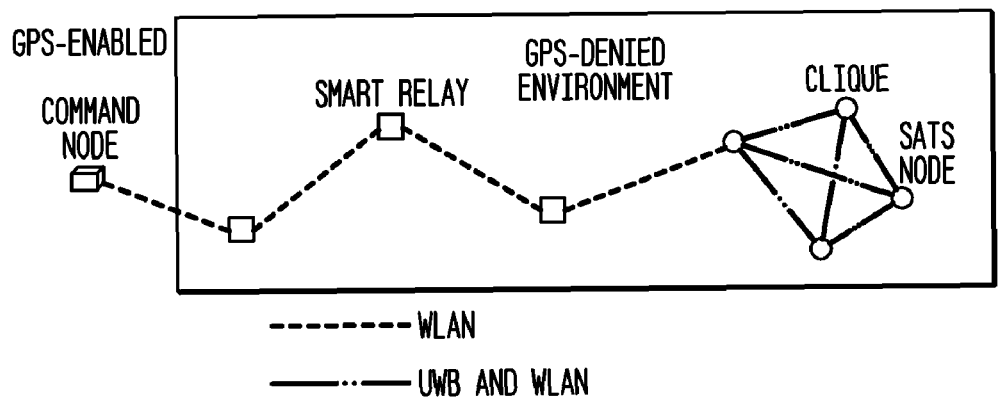
FIG. 1 shows an overview of the inventive system.

The overall system consists of multiple cliques of SATS devices, one to three relays, and an anchored station or command node as shown in FIG. 1. The SATS environment includes both GPS-enabled and GPS-denied partitions. As shown in FIG. 1, the SATS system includes the following components: command node 10, SATS node 12, and Smart Relay 14.

In one embodiment, the Command Node 10 is a computer that has an 802.11 interface. The Command Node 10 is responsible for the following functions: initialization of the SATS nodes 12, including assignment of one SATS node, e.g., node #1, as the SATS leader node, running a graphical user interface (GUI) in the north-facing mode, discussed below, to keep updating the location of the clique, and maintaining communication with the SATS leader node via WLAN.

A number of SATS nodes 12, typically from three to twenty, form a clique, e.g., small fire team, and the clique has a SATS leader node. Each SATS node 12 communicates with every other node via two RF links: UWB and WLAN. UWB is for pair wise ranging among SATS nodes, and WLAN is used to convey other data such as IMU data. The WLAN is also used to communicate between the SATS leader node and the Command Node 10 via Smart Relays 14. Each SATS node 12 has a GUI that shows the location of clique members. Both a forward-facing and a north-facing mode of viewing are supported. The forward-facing mode provides a view following the direction the user, e.g., Marine, rescue worker, is facing. The north-facing mode provides a view that always points in the north direction (like a map). The north-facing mode view is the only view supported in the Command Node 10.

Other auxiliary functions of the SATS node include: Warning of foreign WLAN detected; Alert of dropping of Smart Relay 14; Icon to display the north direction (like a compass); and Text capability.

Smart Relays 14 are used by SATS to relay messages between the SATS leader node and the Command Node 10, when a clique wanders too far from the Command Node 10. The Smart Relay 14 operates on a WLAN interface. When the SATS leader node is getting far from the Command Node 10, it senses that the WLAN signal is weak. The Command Node 10 then displays a message to alert the SATS leader to drop a Smart Relay 14. In addition to the message, a beeping sound can be emitted. The Smart Relay 14 can be a minicomputer with a WLAN interface. Once a Smart Relay 14 is deployed, that is dropped and/or placed in a convenient location, it relays messages by re-broadcasting. Each message has a sequence number, so that duplicated messages can be dropped by the receiver.

Two key metrics for analysis and quantification of the performance of GPS-Denied navigation can be used. The first is the Relative Position Error (RPE), which is represented by two components, the relative distance error (RDE) measured in meters and relative orientation error (ROE) measured in degrees of an angle. The second metric is Clique Drift Error (CDE). This measures the absolute error between the centroid, e.g., center of mass, of the polygon formed by the clique, and the centroid of the SATS polygon, with respect to a fixed reference point.

Figure 2:
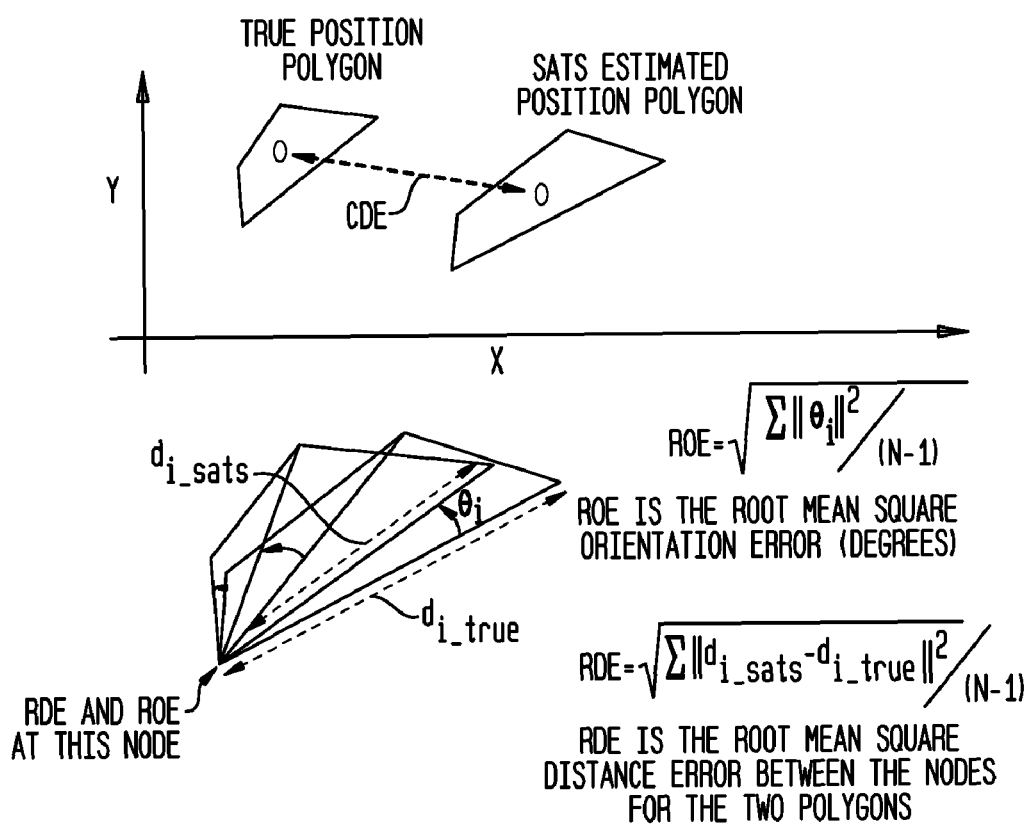
FIG. 2 illustrates the definitions of RPE and CDE.

FIG. 2 illustrates the definitions of RPE and CDE. The precise definition of the performance metrics is as follows. RPE consists of two sub categories both dealing with relative localization of the clique. Relative Distance Error (RDE) is defined as the root mean square error between the SATS estimated distances and the true distances of all the nodes. Relative Orientation Error (ROE) is defined as the root mean square orientation error (in degrees) between the SATS estimated orientation and the true orientation of all the nodes.

CDE is defined as the absolute root mean square distance error with respect to a fixed reference point between the SATS estimated position and the true position.

In certain applications, RPE is considered to be a more important metric. For example, the key strength of Orientation-correcting Polygon Matching Algorithm (OPMA), discussed below, is targeted improvement of the performance of RPE.

The inventive system is based on using UWB ranging information as a constraint tracking process. The SATS process performs a search and optimization procedure to find the best new locations subject to constraints provided by updated ranging information and per-node magnetometer information. In addition, SATS has an orientation error tracking feedback loop to perform self-correction of clique level orientation errors.

The inventive approach can be illustrated using a 4-node clique. Suppose at a time t, the estimated positions of the nodes are known, and the node positions at time t+1 are desired. Note that each unit of time corresponds to a position estimate. Therefore, in practice each time unit may be within one to a few seconds. To perform the estimate of new position at t+1, we use a procedure called Polygon Matching Algorithm (PMA).

Figure 3:
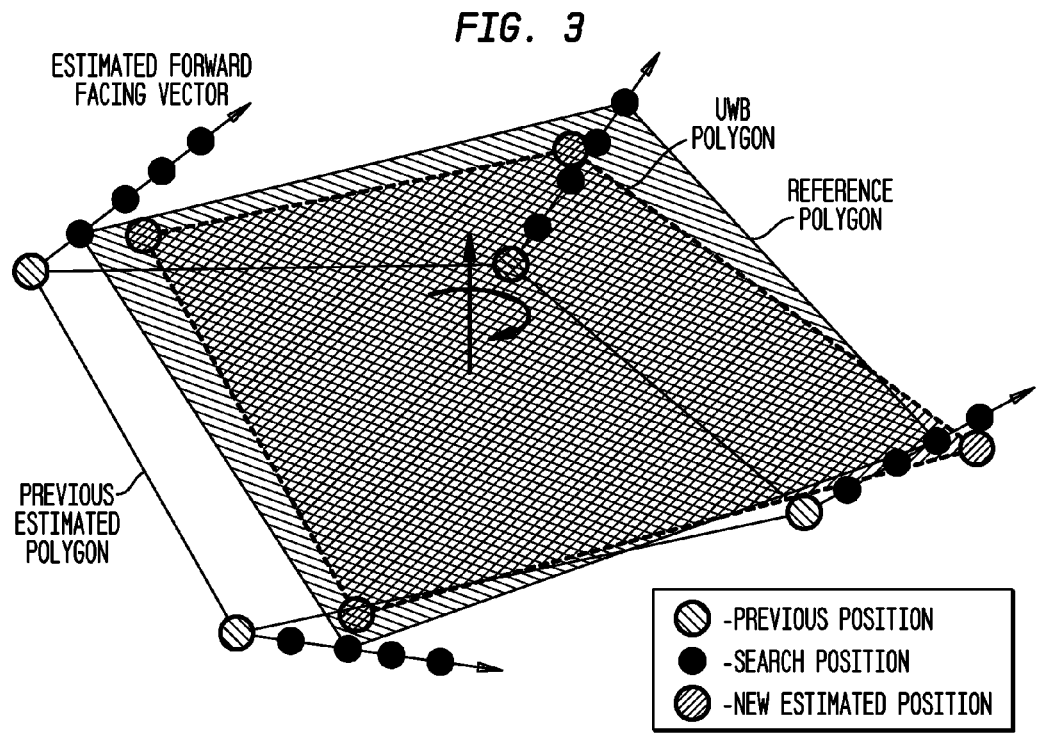
FIG. 3 shows the Polygon Matching Algorithm.

The PMA is composed of two distinct steps. The first step is called PMA-Search and the second step is called PMA-Rotate. The goal of the PMA-Search is to find a best reference polygon whose links are closest to those of the UWB Polygon at time t+1 ($U_{T+1}$). As shown in FIG. 3, a forward facing vector (FFV) is obtained at each node at time t, using the magnetometer. The FFV provides the estimated direction of a node between times t and t+1. Once the FFV is decided, the search positions are defined to be equidistance points on the FFV, as shown as black dots in FIG. 3. These are the search positions with respect to the reference polygon. For four nodes with seven equidistance points on each FFV, there are a total of $7^4$ search points. The search criterion is given by:

$$Js = \min_{i,j,k,l} \sum_{PolyLinks} |Rxy - Uxy| \tag{1}$$

where i,j,k,l ranges from 0 to 6 v, (v is a search step). xy's are the links of the polygon, Rxy is the length of the link of the reference polygon, Uxy is the length of the corresponding link from UWB Polygon.

Equation (1) searches for the reference polygon that is closest to the UWB polygon. Due to various errors from UWB, previous estimates, and FFV, the reference polygon will not match the UWB polygon. The second part of PMA, i.e. the PMA-Rotate step, estimates the new position at time t+1 using the UWB polygon. This is achieved by first placing the floating UWB polygon with its centroid coinciding with that of the reference polygon obtained from PMA-Search. The distances from the UWB vertices (Vu) to the reference polygon vertices (Vr) are then computed and added together to form a new penalty function with respect to an initial UWB polygon orientation of β. The UWB polygon will be rotated until the minimum of the penalty function ($J_r$) is found according to:

$$Jr = \min_{\beta} \sum_{i} |Vr(i) - Vu(i, \beta)| \quad (2)$$

The positions corresponding to this minimum penalty $J_r$ are the new clique estimate.

The PMA-Search procedure requires $S^N$ search steps (where N is the number of nodes and S is the number of equidistant, search points). The requirement becomes computationally impractical for even a moderate number of nodes, say 10, making the approach un-scalable with respect to the number of nodes. A modification to the search process, which achieves a linear increase in computation with respect to the number of nodes, is now described.

Figure 4:
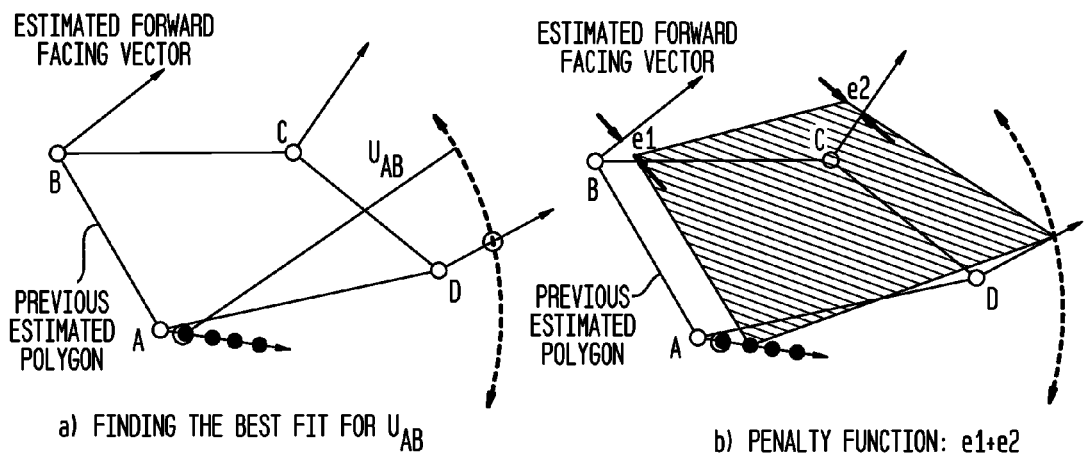
FIG. 4 shows a scalable approach to the Polygon Matching Algorithm.

In this modified process, instead of searching for all the combination of the points on each of the FFV, pick one node, for example node A, and search on the FFV of A for S points. For each of the S points, a circle of radius is drawn, the radius given by the UWB distance between node A and node D (node D can be selected without loss of generality). The circle from A will intersect the FFV of D at none, one, or two points. If there is no intersection, the point on the circle that is closest to D's FFV is used as the solution point. If there are two points or solutions, the distance moved is compared, and the point that is within the search range is selected. FIG. 4b shows the situation obtained once the solution point is computed, in which the new UWB polygon (dotted-line) is placed onto the search point at A and the intersection point at D. An error function of e1+e2 is then obtained, in which e1 and e2 are the perpendicular distances of the corresponding UWB vertices to B's FFV and C's FFV respectively. As the search proceeds, the minimum error function will be selected to produce the new reference polygon. Because only the S point of one node is searched, and all other locations are computed, this process's complexity is linear with respect to the number of nodes.

The PMA described above exerts no control on the clique orientation, which is expected to wander randomly without bound, and roughly as a linear function of time. This error accumulation could be quite bad from a user perspective. For example, if clique orientation error accumulates at a rate of 0.5° per second, it would only take 6 minutes to incur 180 degrees clique orientation error. If that happens, it would mean that node A will think that node B is on its left side, while node B is really on its right side. To attain an error bound to within 45° in 1 hour would require the clique orientation (CO) error rate to be about 0.01 degree/sec, an impractical performance benchmark.

Accordingly, it is necessary to attain control over clique orientation, given that the main measurement device is distance among nodes. A review of PMA shows that an assumption with respect to the PMA-Search was that the node reset positions are used to predict the next positions. However, the reset node positions contain errors resulting from both steps of PMA, namely, searching for the reference polygon, and the polygon matching between UWB polygon and the reference polygon. Part of this error manifests itself as the clique orientation error, which accumulates without bound. If just the clique orientation error component is detected and quantified, this component can be controlled.

As described above, the capability to navigate in SATS is based on the PMA. Further, the PMA already provides a framework that allows measurement of clique orientation error. However, the PMA needs to be modified to direct the resource for clique orientation. This addition capability can be called "Orientation-correcting PMA" or OPMA.

The steps for OPMA are as follows. Find an "error function" associated with clique orientation. The error function is smallest for correct clique orientation compared to other incorrect clique orientations. In one embodiment, a measure of the deviation (P) between the reference polygon and the UWB polygon as the error function for measuring the degree of clique orientation error can be used. This measure is given by:

$$P(\theta_n) = \sum_{t=t0}^{t0+T} \sum_{i} |R_i - U_i| \quad (3)$$

where: $\theta_n$ is the n-th trial clique orientation at time=$t_0$;
$R_i$ is the i-th leg of the reference polygon resulted from PMA search;
$U_i$ is the i-th leg of the UWB polygon resulted from PMA matching; and
$P(\theta_n)$ is computed from $t_0$ to $t_0+T$ (T is an interval of error accumulation).

The goal is to find $\theta_n$ which gives the smallest $P(\theta_n)$ by trying multiple different clique orientations. Clique Orientation (CO) is defined as the angle between North and the a-b link of FIG. 5a.

The rationale for choosing this error function is illustrated in FIG. 5. As shown in FIG. 5a, when the polygon has no orientation error at time t, the error function attains a value of zero, provided that there are no errors due to UWB polygon and facing vector. When the starting position of the clique has a CO error of 25° as shown in FIG. 5b, we can see that the PMA results in a non perfect match; however, this deviation error) P(25°) is small. When the CO error is 90°, the deviation error) P(90°) is visually much larger. The relatively small P at a CO error of 25° is not itself sufficient to differentiate picking the right starting CO. However, if P is accumulated for a duration of T seconds, one can distinguish among different starting CO's. Hence equation (3) sums the square of the difference between the reference polygon and the UWB polygon for a period of T seconds. In one embodiment, T can be chosen to be from 30-60 seconds.

The graphical representation of FIG. 5 exaggerates the magnitude of the forward facing vector or FFV for illustration purposes. A MATLAB simulation result that confirms the claim regarding the behavior of the error function is described. In this simulation, start with a 4-node polygon at time t. From time t to t+1, the nodes move for a vector displacement given by $w_i$, i=1 ... 4, for nodes a, b, c, d, respectively as illustrated in FIG. 6. The $w_i$'s are the forward facing vectors as described above.

In the MATLAB simulation, rotate the original polygon of FIG. 6 in the clockwise direction at an increment of 5°. Each rotation represents a clique orientation error of 5°. For each rotated position, perform the search step of the PMA and find the best reference polygon that matches the FFV direction and the smallest error compared to the UWB polygon at t+1. Thus the PMA will be fully simulated for each rotated orientation. The computed error function, which is recorded, is given by:

$$P(\theta) = \sum_{t=t0}^{t0+1} \sum_{i} |R_i - U_i| \quad (4)$$

Figure 7:
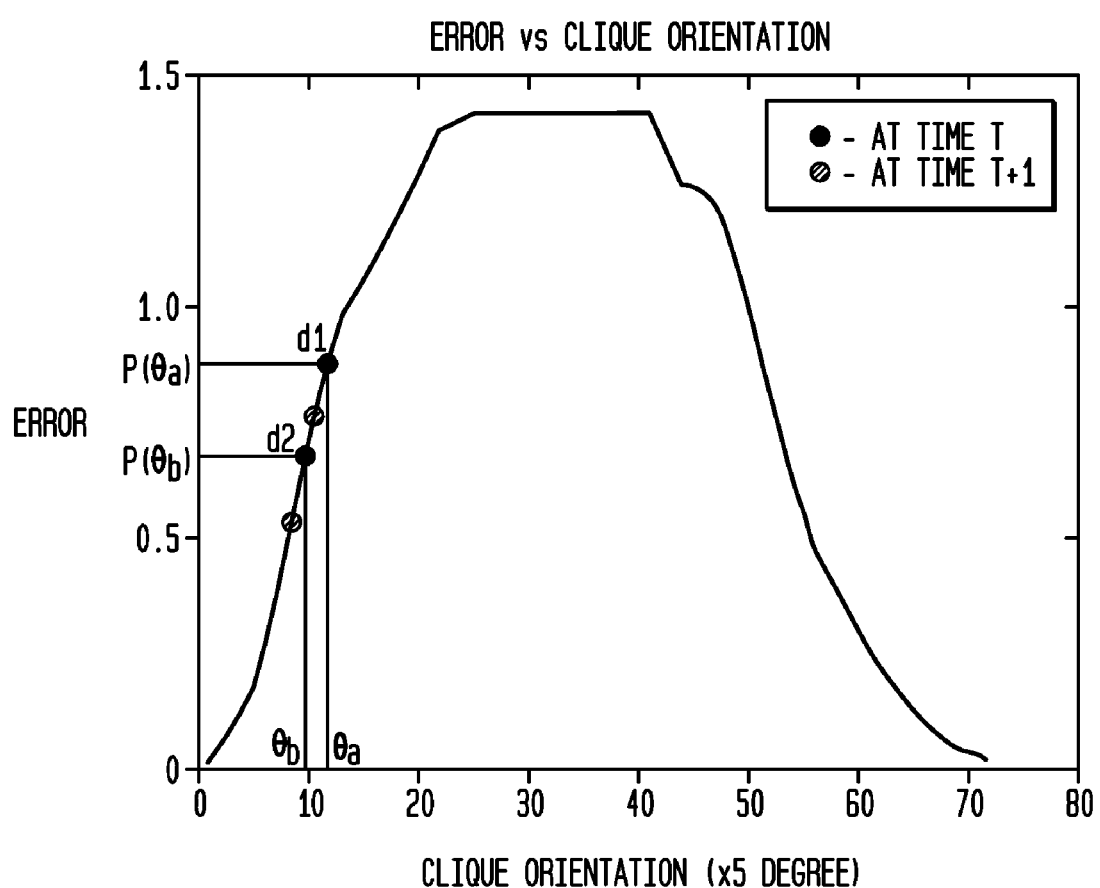
FIG. 7 shows a simulation showing polygon error as a function of clique orientation deviation.

Notice equation (4) is very similar to equation (3) except that T=1 in equation (4), and that θ covers all the possible orientations, in 5° increments. The result of the simulation is shown in FIG. 7.

The OMPA process is described. FIG. 7 illustrates that the error function assumes a larger value when the clique is rotated away further from the correct orientation in a monotonic manner, although it is not symmetrical with respect to direction of the rotation. This means that the correct orientation corresponds to the minimum of the error curve, which is the most important property to be used in the OPMA. Consider that, at any point in time, the clique orientation deviates from the correct orientation by an angle of say 50°, as shown as "d2" point in FIG. 7, the clique should be guided so that it moves towards the correct orientation. To steer the system in the right direction, the direction the clique should be rotating, and by how much, is needed. Moreover, this steering should be adaptive, allowing dynamic orientation adjustment all the time.

The OPMA operates in the following way. At a given time, each node starts with two orientations $\theta_a$ and $\theta_b$, such that $\theta_a = \theta_b + q$, where q (>0) is a design parameter. As an example, q is set to 10°. For each update instance T, the error function values $P(\theta_a)$ and $P(\theta_b)$ are computed and compared. Depending on which value is larger, $\theta_a$ and $\theta_b$ for the next update period is adjusted according to the following rule:

$$\text{if } P(\theta_a) > P(\theta_b) \text{ at } T \quad \begin{array}{l} \theta_a(T+1) = \theta_a(T) - \rho \\ \theta_b(T+1) = \theta_b(T) - \rho \end{array} \quad (5)$$

$$\text{if } P(\theta_a) > P(\theta_b) \text{ at } T \quad \begin{array}{l} \theta_a(T+1) = \theta_a(T) + \rho \\ \theta_b(T+1) = \theta_b(T) + \rho \end{array}$$

where ρ (>0) is a design parameter. As an example, ρ may be set to 5°.

Figure 8:
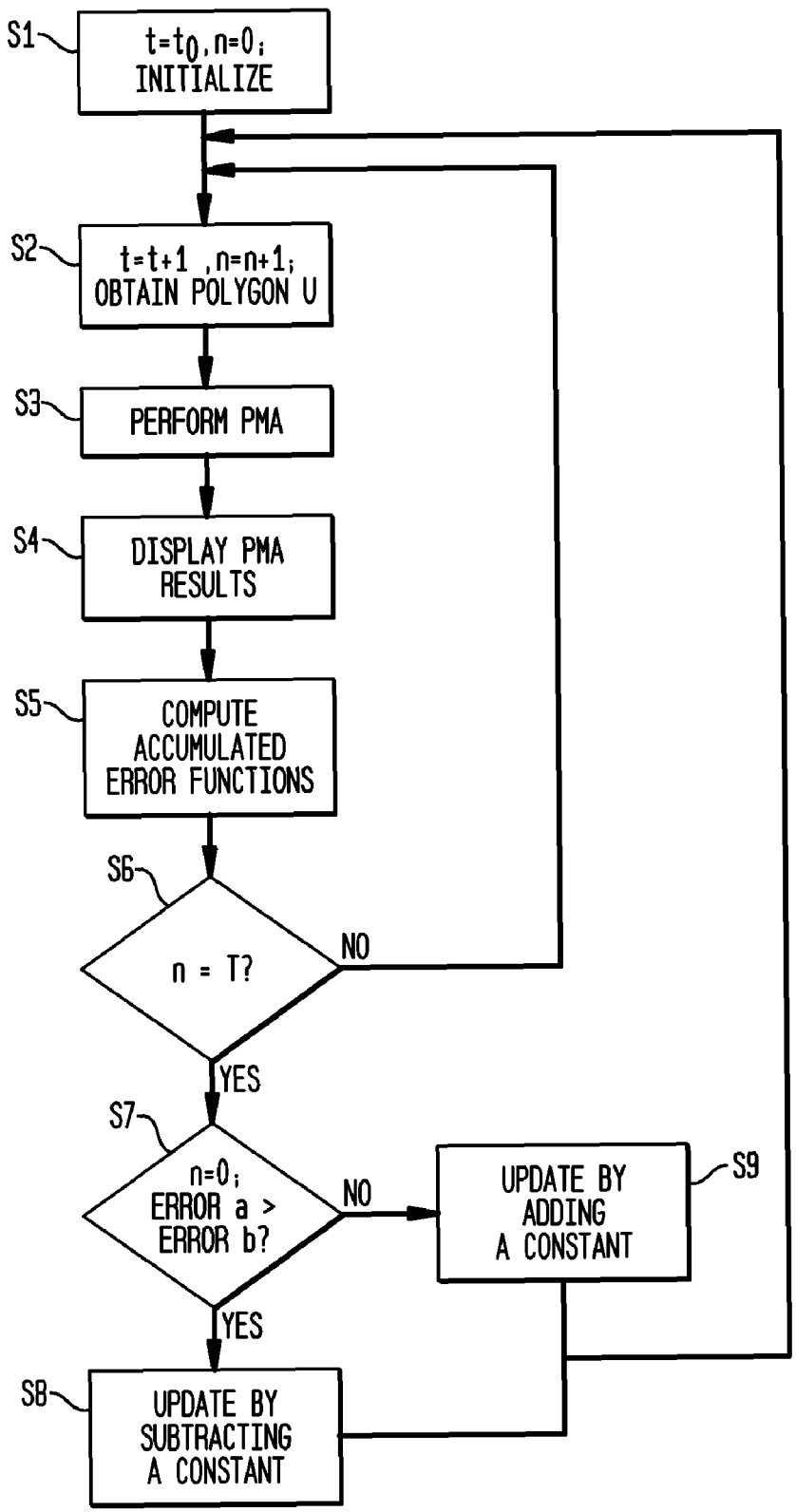
FIG. 8 is a flow diagram of OPMA.
Figure 11A:
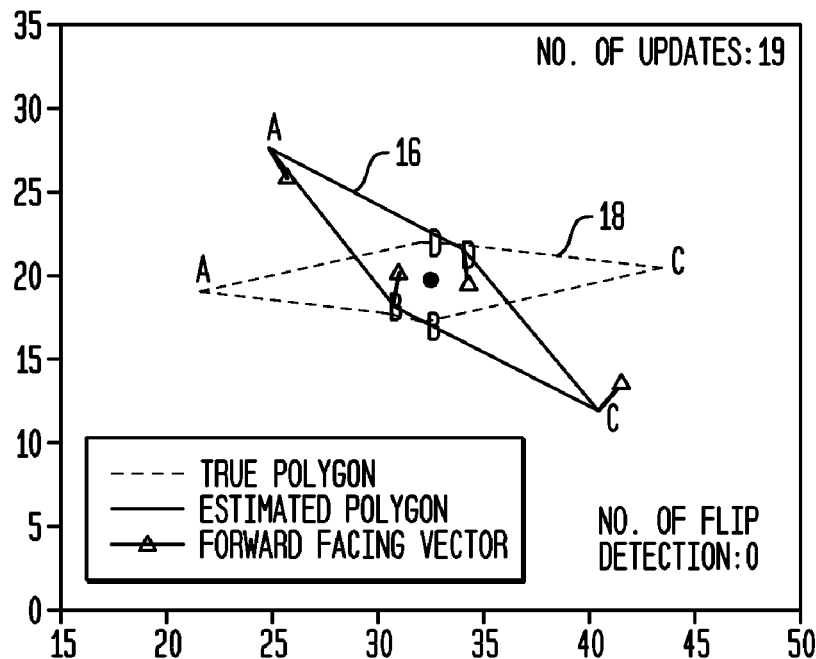
FIG. 11 shows estimated and true polygon snapshots from a simulation.
Figure 11B:
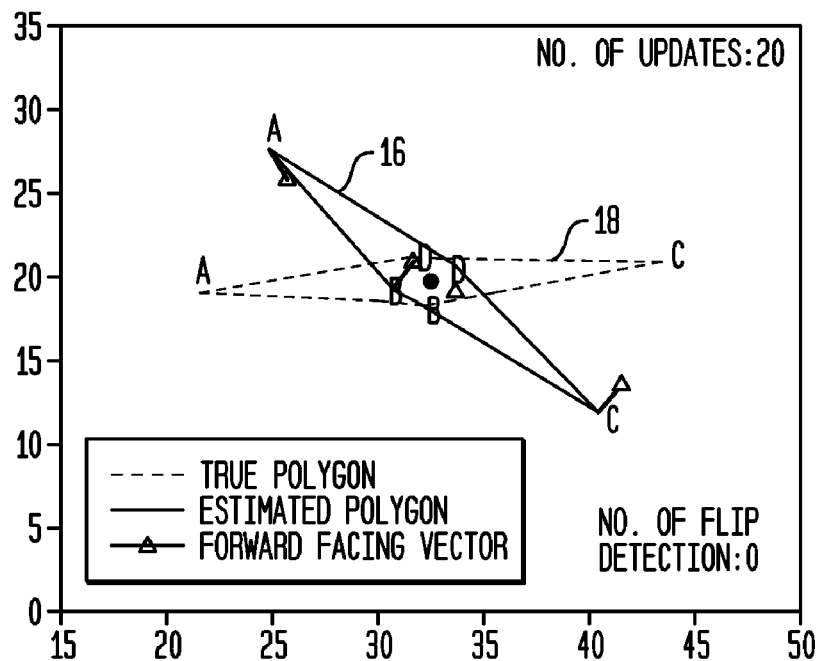
Figure 11C:
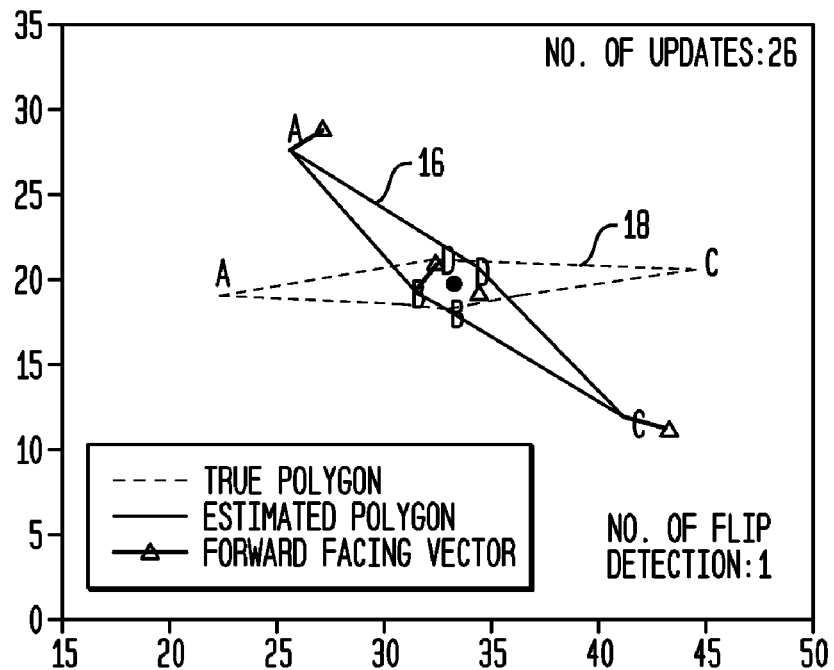
Figure 11D:
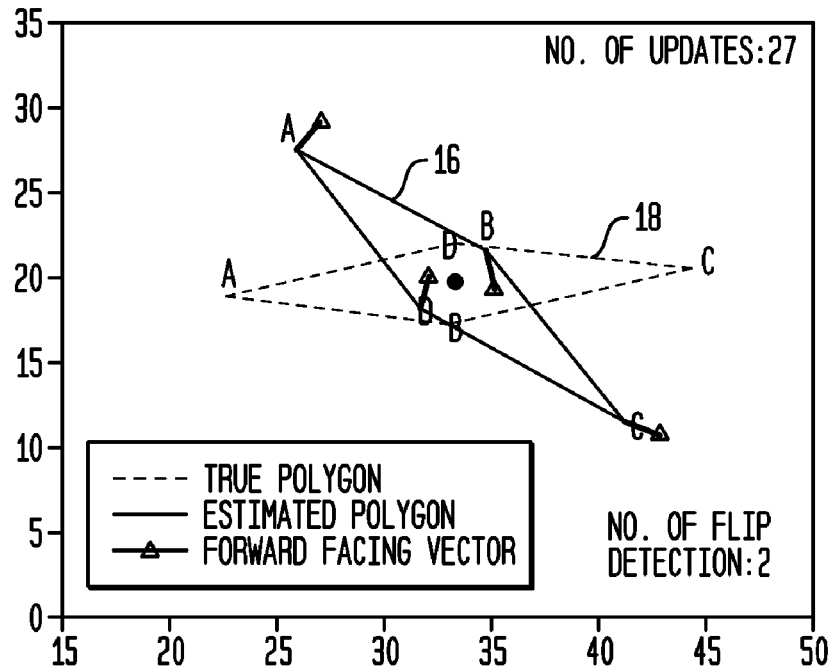
Figure 11E:
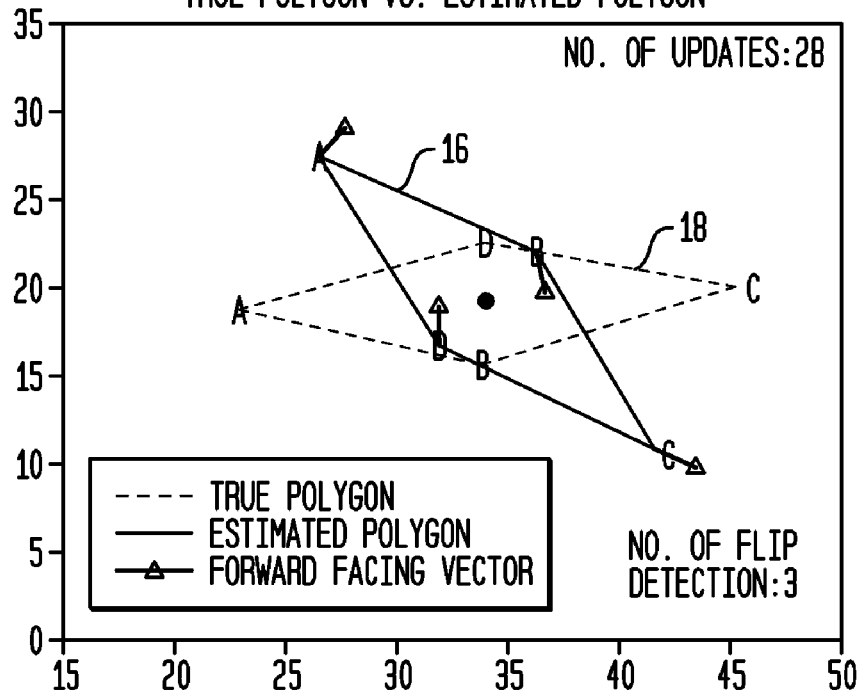
Figure 11F:
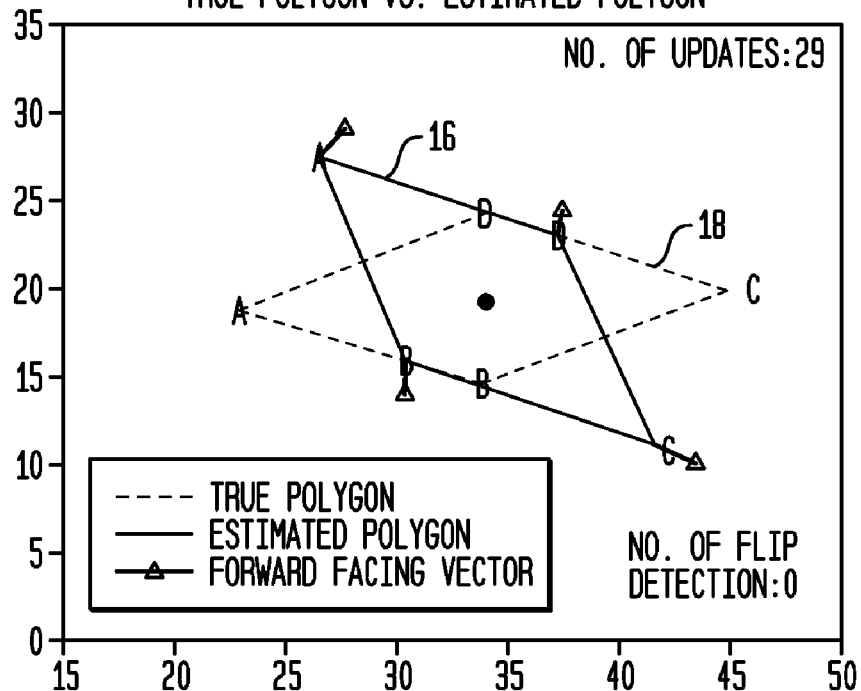

The simulation result suggests that the clique orientation can be adjusted according to two measurements, namely, $P(\theta_a)$ and $P(\theta_b)$. FIG. 8 illustrates a flow chart of OPMA adaptation. At time $t=t_0$, step S1, two orientations $\theta_a$ and $\theta_b$ are initialized as $\theta_a = \theta_b + q$, (q>0) and n is initialized as 0. In step S2, t and n are incremented by 1, and the UWB polygon $U_{t+1}$ is obtained; this is the pair-wise ranging measurement. In step S3, PMA is performed using $U_{t+1}$ with respect to $\theta_a$ and $\theta_b$. In step S4, the PMA result is displayed with respect to $\theta_a$.

In step S5, the error functions $P(\theta_a)$ and $P(\theta_b)$ are computed. The steps S2 through S5 are repeated until n=T. In step S6, n is compared with T. If n is not equal to T (S6=NO), processing continues at step S2.

When n=T (S6=YES), in step S7, n is reset to 0; and if $P(\theta_a)$ is greater than $P(\theta_b)$ (S7=YES), then in step S8, $\theta_a(t_0+T)$ is set to $\theta_a(t_0)-\rho$, and $\theta_b(t_0+T)$ is set to $\theta_b(t_0)-\rho$, then processing continues at step S2.

If $P(\theta_a)$ is less than $P(\theta_b)$ (S7=NO), then in step S9, $\theta_a(t_0+T)$ is set to $\theta_a(t_0)+\rho$, and $\theta_b(t_0+T)$ is set to $\theta_b(t_0)+\rho$, then processing continues at step S2.

The Orientation-correcting PMA (OPMA) described above adaptively corrects a clique orientation drift by trying two different orientation angles at each starting time of orientation correction intervals and selecting estimated positions that give a smaller error, i.e., a smaller $P(\theta_n)$. However, if a polygon flip occurs at each starting time of orientation correction updates, OPMA cannot correct the clique orientation drift. This is because the error function $P(\theta_n)$ of OPMA does not show the characteristics shown in FIG. 7 in case of a polygon flip.

A polygon flip is defined as a situation in which the simple polygon of estimated positions is flipped compared to the simple polygon of true positions. FIG. 9 illustrates an example of a polygon flip when PMA is used for group location tracking.

FIG. 9a shows two true polygons consisting of four nodes at $t=t_0$ and $t=t_0+T$, respectively, and true forward facing vectors (FFVs) of the nodes at $t=t_0$. FIG. 9b illustrates how an estimated polygon at $t=t_0+T$ is flipped when there are errors in forward facing vectors. At $t=t_0+T$, a UWB polygon is created based on UWB pair-wise ranging measurements. Since the pair-wise ranging information does not provide polygon orientation information, the floating UWB polygon in two-dimensional space has two different versions as shown in the upper part of FIG. 9b. The UWB polygon in the upper right corner of FIG. 9b is considered as 'flipped', compared to the true polygon at $t=t_0+T$ in FIG. 9a in a sense that the order of the vertices of the UWB simple polygon in a counter clockwise direction (i.e., A, D, C and B) is different from that of the true simple polygon (i.e., A, B, C and D).

Once two types of floating UWB polygons (a non-flipped polygon and a flipped polygon) are obtained, the PMA-Search and PMA-Rotate are applied to the previous estimated polygon using the two floating UWB polygons. The polygon flip is caused by a combination of various errors such as UWB measurements errors, the orientation errors of previous estimates, and FFV errors. In the example of FIG. 9, the estimated FFV at node B in FIG. 9b has an error and its orientation is rotated to the right side from node B's perspective, compared to the true FFV at node B in FIG. 9a. As a result, at $t=t_0+T$ the best estimated polygon with a minimum PMA error is obtained from the flipped polygon. From node A's perspective, when node A faces node C, the estimated position of node B is on its right side and the estimated position of node D is on its left side while the true positions of node B and D are opposite to the corresponding estimated positions.

A polygon flip often occurs when two nodes get close and move away from each other without crossing each other. UWB measurement outliers also cause a polygon flip. In some cases, a polygon flip situation lasts for a long period of time. In these cases, OPMA does not work since the OPMA error function $P(\theta_n)$ defined above does not show the characteristics shown in FIG. 7. To resolve this polygon flip issue, a novel mechanism of detecting and correcting a flipped polygon is presented.

A polygon flip detection procedure is derived by observing the relationship between forward facing vectors and changes of UWB pair-wise measurements. FIG. 10 illustrates an example of a polygon flip detection.

In this example, suppose that at time $t=t_0$, the estimated polygon 16 is flipped as shown in FIG. 10a. Also suppose that node D is heading north (i.e., to the upward direction in the figure) and node B is heading south. Then at $t=t_0+T$, the distance between node B and node D will increase as shown in FIG. 10b, since each node is moving to an opposite direction of the other. However, at time $t=t_0$, PMA considers that the estimated forward facing vectors of node B and node D are facing each other since the estimated polygon 16 is flipped compared to the true polygon 18. Based on this observation, the following polygon detection and correction (PFDC) procedure can result.

In each update of polygon matching, find all $U_{xy}$ satisfying $|U_{xy,t}-U_{xy,t-T}|>l_{th}$, where x and y are node indices, $U_{xy,t}$ is the UWB ranging measurement between the two nodes, $U_{xy,t-T}$ is the UWB ranging measurement at previous update, and T is the PMA update interval. The threshold, $l_{th}$ (>0) in distance change is used to make sure that a distance between two nodes actually changed considering UWB measurement errors. One recommended value is 0.5 meters considering the accuracy of UWB measurement.

For all $U_{xy}$ satisfying the above condition, find all $U_{xy}$ satisfying $90-\theta_{th} \leq \theta_{FFV\_x,FFV\_y} \leq 180$ where $\theta_{FFV\_x,FFV\_y}$ is the smaller angle between the FFV of node x and the FFV of node y. It is expected that two nodes x and y whose corresponding $U_{xy}$ satisfying above two conditions are either getting closer or moving away from each other. The threshold $\theta_{th}$(>0) is used considering errors in FFVs. One recommended value is 30 degrees.

Calculate the expected distance $E_{xy,t}$ between two expected positions $EP_x$ and $EP_y$, where $EP_x$ and $EP_y$ are the calculated positions obtained by adding the unit FFVs of nodes x and y to the previous estimated position vectors of nodes x and y, respectively as shown in FIG. 10a.

The positions of two nodes x and y are considered as flipped if $(U_{xy,t}-U_{xy,t-T})*(E_{xy,t}-U_{xy,t-T})<0$.

If the number of consecutive flip detections for a pair of nodes x and y is greater than a certain positive integer number NF, the process declares that the current estimated positions of x and y are flipped. One recommended value for NF is 3.

For a pair of nodes x and y meeting all conditions above, flip the current estimated polygon across the line which is perpendicular to the line segment connecting nodes x and y and intersects the center of the line segment. If more than one pair of two nodes meet all of the above conditions, do this polygon flip for any one of such pair of nodes.

FIG. 11 shows snapshots of an estimated polygon 16 and a true polygon 18 from a simulation of the proposed PFDC procedure. In the simulation, four nodes were considered. The initial orientation of the estimated polygon was assumed to be wrong with an error of 45 degrees. The forward facing vector of node D was assumed to have 15 degrees of bias error. In this simulation scenario, nodes A and C do not move much while C and D get close up to about 0.5 meter distance and move away from each other over time. However node C and D never cross each other. To consider only relative positions and group orientation, the true polygons 18 and the estimated polygons 16 coincided in all figures of FIG. 11. FIGS. 11a and 11b show true and estimated polygons and FFVs at PMA update number 19 and 20, respectively (e.g., at two consecutive PMA updates). As shown in the two figures, nodes C and D are facing each other and getting closer. During the next several updates, nodes C and D are getting even closer and then moving away from each other again and a polygon flip occurs in the estimated positions. As shown in FIG. 11c, at PMA update number 26, the estimated polygon is flipped and PFDC detects a polygon flip. FIGS. 11c to 11e illustrate that the FFVs of node C and D are facing each other at their corresponding estimated positions even though true positions show that the two nodes are moving away from each other. PFDC detects a polygon flip four consecutive times and corrects the flipped polygon at PMA update number 29.

Figure 12:
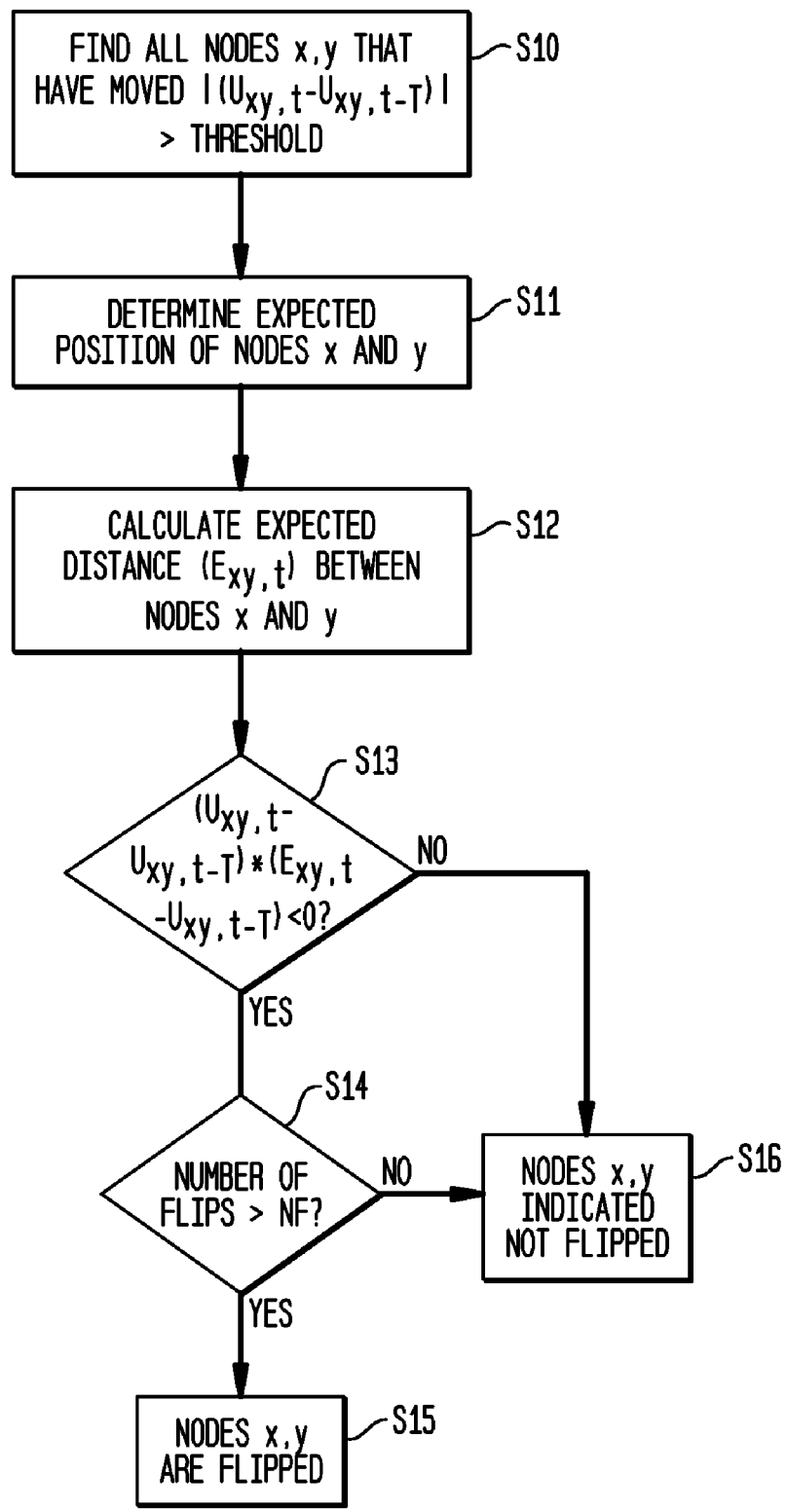
FIG. 12 is a flow diagram of flip detection.

FIG. 12 is a flow diagram for detecting whether a flip has occurred. In each update of polygon matching, in step S10, find all nodes that have moved, e.g., $U_{xy}$ satisfying $|U_{xy,t}-U_{xy,t-T}|>l_{th}$. In step S11, the expected positions of nodes x and y are determined. In step S12, the expected distance $E_{xy,t}$ between two expected positions of nodes x and y is calculated. If $(U_{xy,t}-U_{xy,t-T})*(E_{xy,t}-U_{xy,t-T})<0$ (S13=YES, the positions of two nodes x and y are indicated to be flipped. If the number of consecutive flip detections for a pair of nodes x and y is greater than a threshold (S14=YES), the current estimated positions of x and y are flipped in step S15.

If $(U_{xy,t}-U_{xy,t-T})*(E_{xy,t}-U_{xy,t-T})$ is greater than or equal to zero (S13=NO), nodes x and y are indicated to be not flipped in step S16.

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for self and group location and tracking based on ultra wide band ranging among members of the group, comprising:
   an anchored station;
   a plurality of nodes, each node having at least knowledge of where the node is facing and heading, knowledge of all pair wise distances among all of the plurality of nodes, and ability to exchange information among the nodes and with the anchored station; and
   one or more relays, wherein a leader node among a plurality of nodes determines placement of the one or more relays by detecting a weak signal from the anchored station and an adaptive search process finds a new position estimate of the group based on constraints of the pair wise distances, enabling extracting of directional information and adaptively stabilizing orientation of the group;
    wherein the ability to exchange information comprising inertial measurements and pair wise ranging measurements is performed using WLAN.

2. The system according to claim 1, further comprising both GPS-enabled and GPS-denied partitions.

3. The system according to claim 1, wherein the remote command node initializes the plurality of nodes, assigns one of the nodes as a leader node, runs a graphical user interface in a north-facing mode, and maintains communication with the leader node via WLAN.

4. The system according to claim 1, wherein adaptively stabilizing the orientation of the group is performed using an orientation-correcting polygon matching process.

5. The system according to claim 4, wherein the orientation-correcting polygon matching process comprises steps of:
    initializing a first orientation and a second orientation for each node at a first time;
    for an orientation-correcting interval, incrementing the first time by one and obtaining polygon matching result, and calculating an error function value for the first orientation and the second orientation at a second time; and
    if the error function of the first orientation is greater than the error function of the second orientation, setting a second-interval-first orientation for a second interval to the first orientation less a constant, setting a second-interval-second orientation for the second interval to the second orientation less the constant, otherwise setting the second-interval-first orientation for the second interval to the first orientation plus the constant, setting the second-interval-second orientation for the second interval to the second orientation plus the constant.

6. The system according to claim 4, wherein a flip detection and correction portion of the orientation-correcting polygon matching process comprises steps of:
    determining whether the pair wise distance between a first node and a second node of said plurality of nodes has changed;
    calculating an expected distance between expected positions of the first node and the second node; and
    detecting a flip based on the expected positions of the first and second nodes and the pair wise distance between the first and second nodes.

7. A method for self and group location and tracking based on ultra wide band ranging among members of the group, comprising steps of:
    establishing an anchored station;
    initializing a plurality of nodes while assigning one of the nodes as a leader node, each node having at least knowledge of where the node is facing and heading, knowledge of all pair wise distances among all of the plurality of nodes, and ability to exchange information among the nodes and with the anchored station;
    based on the signal strength from the anchored station, determining placement of one or more relays using the leader node; and
    finding a new position estimate of the group in accordance with an adaptive search process based on constraints of the ultra wide band ranging, said search process enabling extracting directional information and adaptively stabilizing orientation of the group;
    wherein the ability to exchange information comprising inertial measurements and pair wise ranging measurements is performed using WLAN radio.

8. The method according to claim 7, wherein the anchored station performs steps of
    initializing the plurality of nodes;
    assigning one of the nodes as a leader node;
    running a graphical user interface in a north-facing mode; and
    maintaining communication with the leader node via WLAN.

9. The method according to claim 7, wherein adaptively stabilizing the orientation of the group is performed using an orientation-correcting polygon matching process.

10. The method according to claim 9, wherein the orientation-correcting polygon matching process comprises steps of:
    initializing a first orientation and a second orientation for each node at a first time;
    for an orientation-correcting interval, incrementing the first time by one and obtaining polygon matching result, and calculating an error function value for the first orientation and the second orientation at a second time; and
    if the error function of the first orientation is greater than the error function of the second orientation, setting a second-interval-first orientation for a second interval to the first orientation less a constant, setting a second-interval-second orientation for the second interval to the second orientation less the constant, otherwise setting the second-interval-first orientation for the second interval to the first orientation plus the constant, setting the second-interval-second orientation for the second interval to the second orientation plus the constant.

11. The method according to claim 9, wherein a flip detection and correction portion of the orientation-correcting polygon matching comprises steps of:
    determining whether the pair wise distance between a first node and a second node of said plurality of nodes has changed;
    calculating an expected distance between expected positions of the first node and the second node; and
    detecting a flip based on the expected positions of the first and second nodes and the pair wise distance between the first and second nodes.

12. A non-transitory computer readable medium having computer readable program for operating on a computer for self and group location and tracking based on ultra wide band ranging among members of the group, said program comprising instructions that cause the computer to perform the steps of:
    establishing an anchored station;
    initializing a plurality of nodes, each node having at least knowledge of where the node is facing and heading, knowledge of all pair wise distances among all of the plurality of nodes, and ability to exchange information among the nodes and with the anchored station;
    based on the signal strength of the anchored station, determining placement of one or more relays using the leader node; and
    finding a new position estimate of the group in accordance with an adaptive search process based on constraints of the ultra wide band ranging, said search process enabling extracting directional information and adaptively stabilizing orientation of the group;
    wherein the ability to exchange information comprising inertial measurements and pair wise ranging measurements is performed using WLAN radio.

13. The non-transitory computer readable medium according to claim 12, wherein the anchored station performs steps of:

initializing the plurality of nodes;
assigning one of the nodes as a leader node;
running a graphical user interface in a north-facing mode; and
maintaining communication with the leader node via WLAN.

14. The non-transitory computer readable medium according to claim 12, wherein adaptively stabilizing the orientation of the group is performed using an orientation-correcting polygon matching process.

15. The non-transitory computer readable medium according to claim 14, wherein the orientation-correcting polygon matching process comprises steps of:
   initializing a first orientation and a second orientation for each node at a first time;
   for an orientation-correcting interval, incrementing the first time by one and obtaining polygon matching result, and calculating an error function value for the first orientation and the second orientation at a second time; and
   if the error function of the first orientation is greater than the error function of the second orientation, setting a second-interval-first orientation for a second interval to the first orientation less a constant, setting a second-interval-second orientation for the second interval to the second orientation less the constant, otherwise setting the second-interval-first orientation for the second interval to the first orientation plus the constant, setting the second-interval-second orientation for the second interval to the second orientation plus the constant.

16. The non-transitory computer readable medium according to claim 14, wherein a flip detection and correction portion of the orientation-correcting polygon matching comprises steps of:
   determining whether the pair wise distance between a first node and a second node of said plurality of nodes has changed;
   calculating an expected distance between expected positions of the first node and the second node; and
   detecting a flip based on the expected positions of the first and second nodes and the pair wise distance between the first and second nodes.

* * * * *